US009838844B2

United States Patent
Emeis et al.

(10) Patent No.: US 9,838,844 B2
(45) Date of Patent: Dec. 5, 2017

(54) USING AUGMENTED REALITY TO ASSIST DATA CENTER OPERATORS

(71) Applicants: Mark W. Emeis, Monument, CO (US); Robert C. Hendrich, Colorado Springs, CO (US); Craig A. Vosburgh, Colorado Springs, CO (US)

(72) Inventors: Mark W. Emeis, Monument, CO (US); Robert C. Hendrich, Colorado Springs, CO (US); Craig A. Vosburgh, Colorado Springs, CO (US)

(73) Assignee: CA, Inc., New York, NY (US)

( * ) Notice: Subject to any disclaimer, the term of this patent is extended or adjusted under 35 U.S.C. 154(b) by 100 days.

(21) Appl. No.: 14/866,209

(22) Filed: Sep. 25, 2015

(65) Prior Publication Data

US 2017/0091607 A1    Mar. 30, 2017

(51) Int. Cl.
G06K 19/07     (2006.01)
H04W 4/02      (2009.01)
G06T 19/00     (2011.01)

(52) U.S. Cl.
CPC .......... *H04W 4/023* (2013.01); *G06T 19/006* (2013.01)

(58) Field of Classification Search
CPC .......... G06K 19/0712; G06K 19/0727; H04W 4/023
USPC ....................... 340/539.13, 539.15
See application file for complete search history.

(56) References Cited

U.S. PATENT DOCUMENTS

| 2002/0069072 | A1  | 6/2002  | Friedrich et al. |
|---|---|---|---|
| 2007/0005382 | A1  | 1/2007  | Sayers |
| 2012/0249588 | A1  | 10/2012 | Tison et al. |
| 2013/0031202 | A1* | 1/2013  | Mick ............... G06Q 10/06 709/217 |

(Continued)

OTHER PUBLICATIONS

Joseph, S. L., et al., "Semantic Indoor Navigation with a Blind-User Oriented Augmented Reality," SMC '13 Proceedings of the 2013 IEEE International Conference on Systems, Man, and Cybernetics, 2013, pp. 3585-3591, available at http://dl.acm.org/citation.cfm?id=2571933&preflayout=flat.

(Continued)

*Primary Examiner* — Sisay Yacob
(74) *Attorney, Agent, or Firm* — Baker Botts L.L.P.

(57) ABSTRACT

Systems and methods include receiving notification of an anomaly in a particular component within a data center environment. Such systems and methods include receiving configuration information identifying positions of tags disposed proximate to and representing respective infrastructure components within the data center environment. Such systems and methods include detecting a first tag representing a first infrastructure component and, in response thereto, determining, using the configuration information, a first positional relationship between the first tag and a second tag representing the particular component. Such systems and methods include determining a second positional relationship between the mobile device and the particular component based on the first positional relationship and providing, based on the second positional relationship, directional guidance from the first infrastructure component to the particular component. Such systems and methods include detecting, by the sensor, the second tag and, in response thereto, providing information identifying the particular component.

20 Claims, 10 Drawing Sheets

(56) References Cited

U.S. PATENT DOCUMENTS

| | | | |
|---|---|---|---|
| 2013/0038633 A1 | 2/2013 | Maggiore | |
| 2013/0186956 A1* | 7/2013 | Ashok | G06F 17/30 235/385 |
| 2013/0221096 A1* | 8/2013 | Ashok | G06F 17/30 235/385 |
| 2013/0332452 A1* | 12/2013 | Jarvis | G06F 17/3087 707/724 |
| 2014/0040252 A1* | 2/2014 | Jarvis | G06F 17/3087 707/724 |
| 2014/0258052 A1* | 9/2014 | Khuti | G06Q 10/087 705/28 |

OTHER PUBLICATIONS

Denholm, M., "Now These Are Real Smart Glasses," Wall Street Daily, Mar. 12, 2015, available at http://www.wallstreetdaily.com/2015/03/12/augmented-reality-blind-glasses/print/.

Metz, R., "Augmented-Reality Glasses Could Help Legally Blind Navigate," MIT Technology Review, Jun. 15, 2015, available at http://www.technologyreview.com/news/538491/augmented-reality-glasses-could-help-legally-blind-navigate/.

"iBeacon," Wikipedia, available at https://en.wikipedia.org/wiki/IBeacon (searched on Sep. 15, 2015).

Blum, J. R., et al., "What's around me? Spatialized audio augmented reality for blind users with a smartphone," McGill University, 2011, available at http://srl.mcgill.ca/publications/2011-MOBIQUITOUS.pdf.

"2010/Non-visual location-based augmented reality using GPS data," Open Source Bridge, 2010, available at http://opensourcebridge.org/wiki/2010/Non-visual_location-based_augmented_reality_using_GPS_data.

Deffeyes, S., "Mobile augmented reality in the data center," IBM Journal of Research and Development, 2011, pp. 5:1-5:5, vol. 55, Issue 5, available at http://ieeexplore.ieee.org/xpl/articleDetails.jsp?&arnumber=6032768.

* cited by examiner

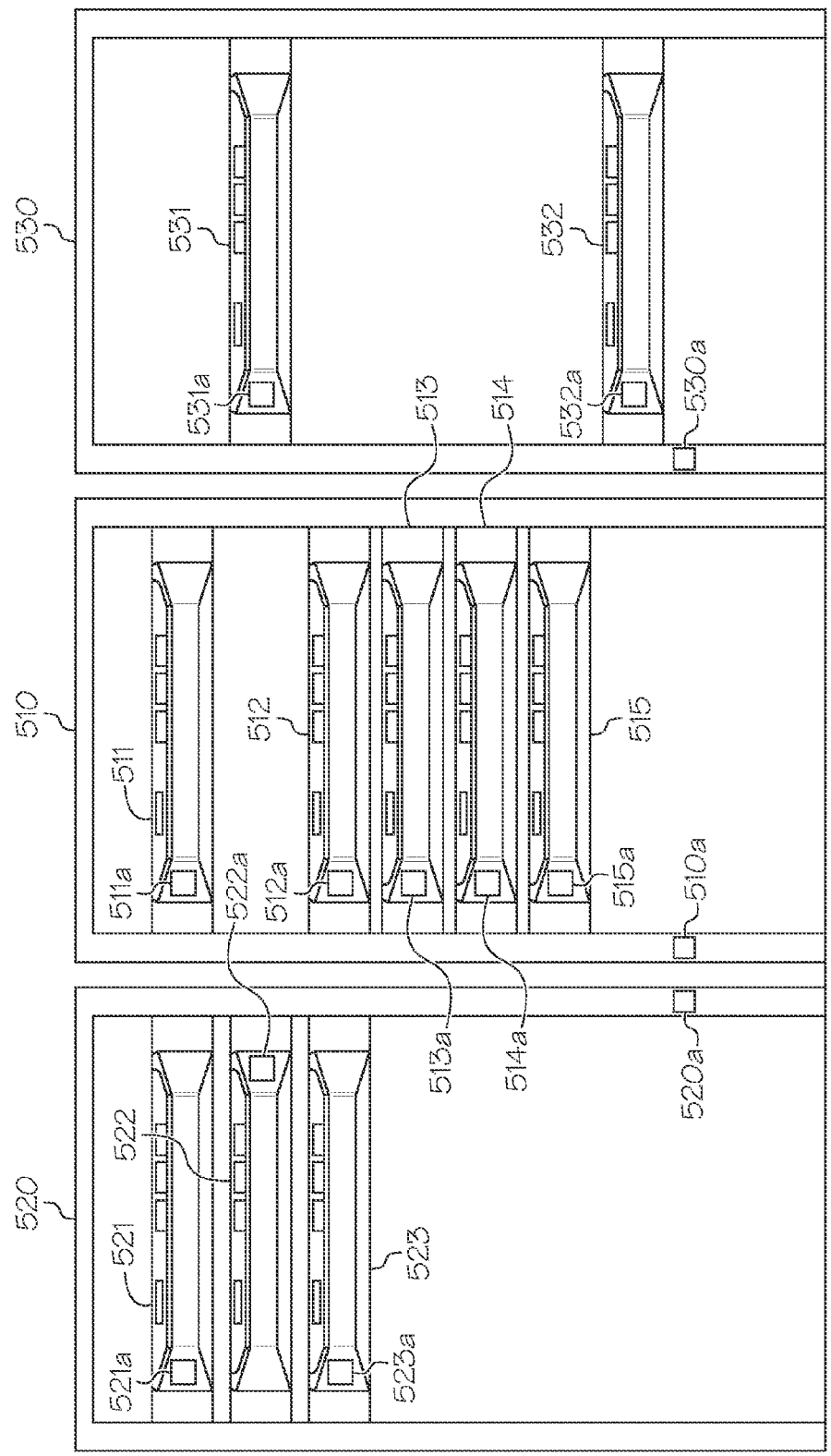

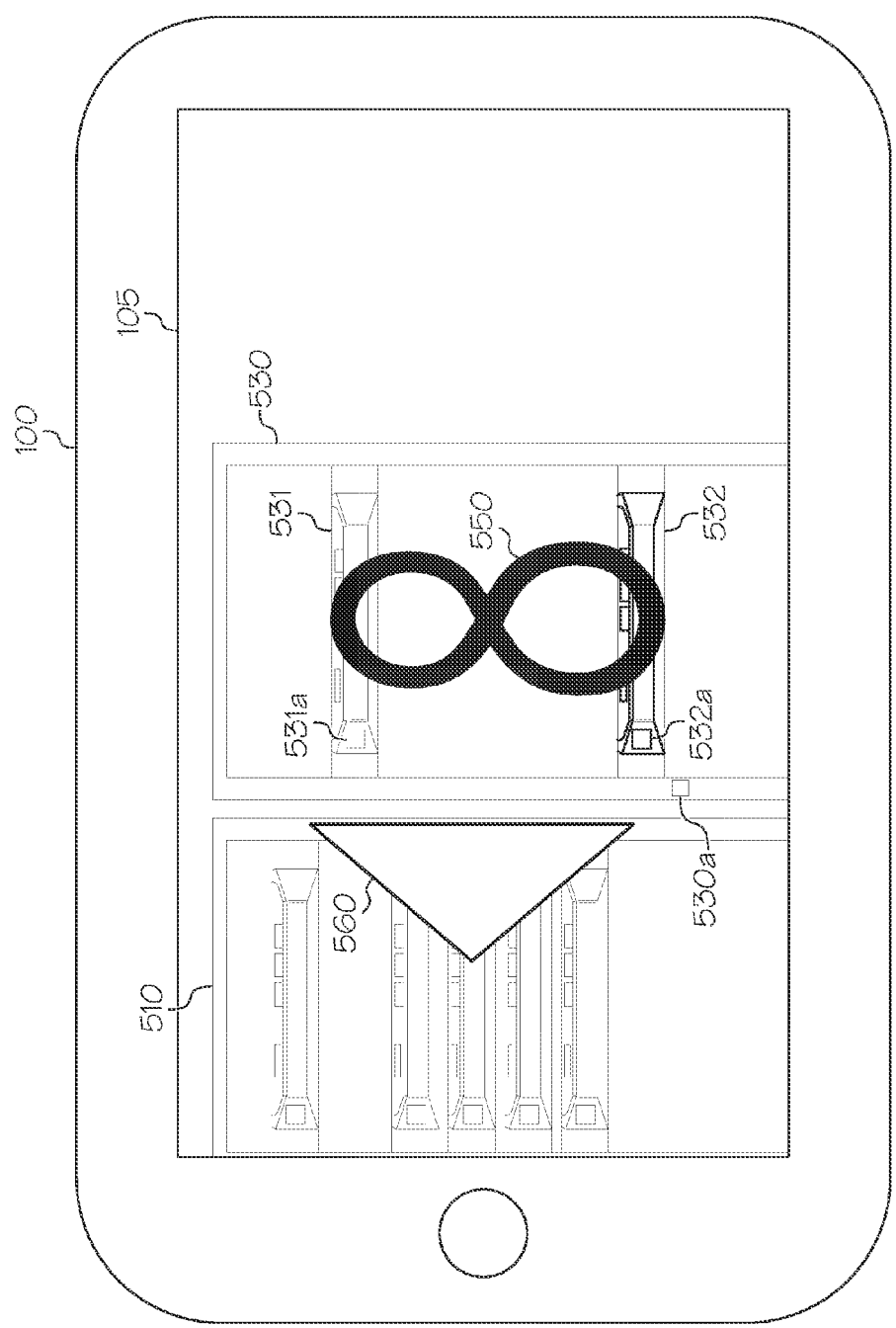

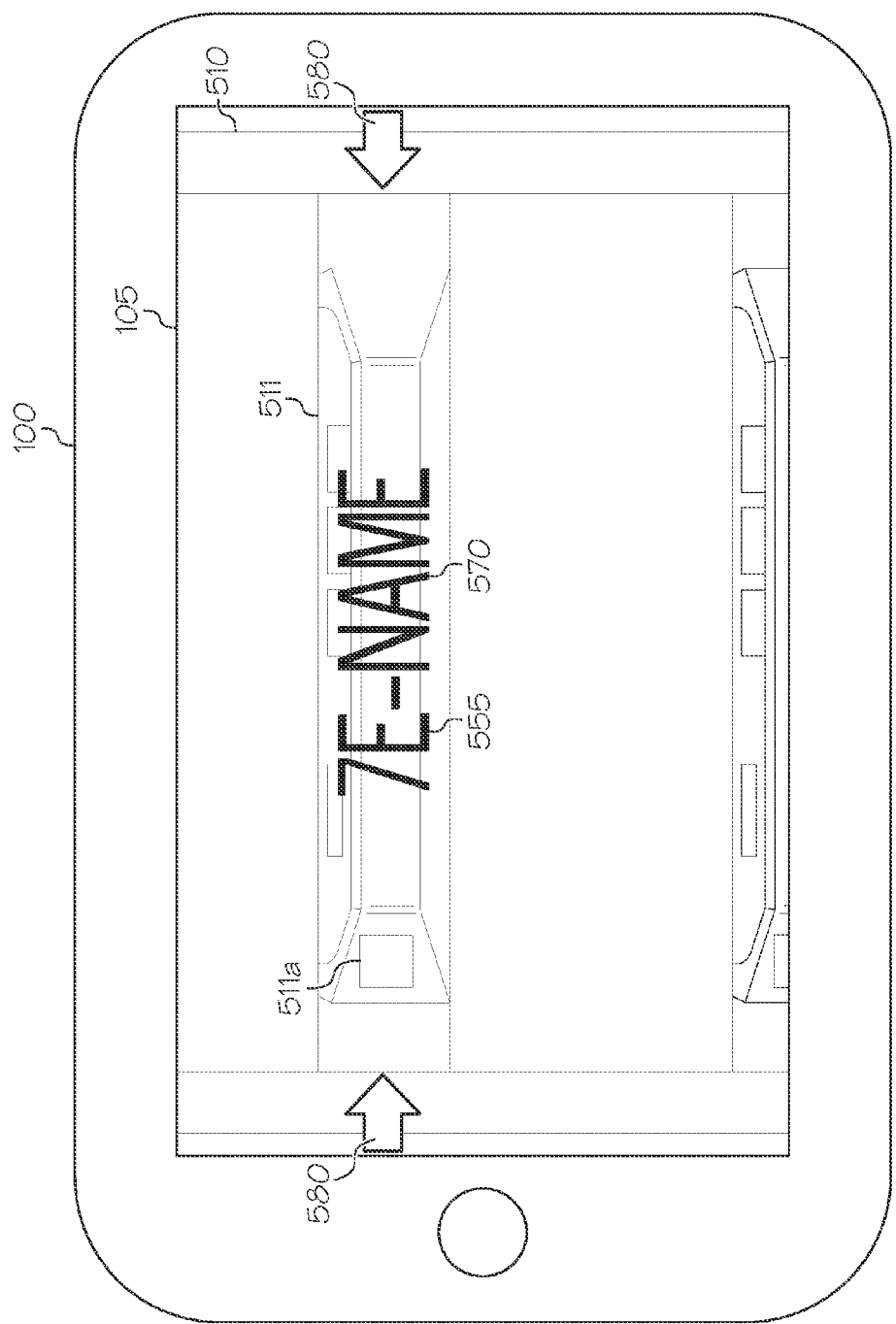

USING AUGMENTED REALITY TO ASSIST DATA CENTER OPERATORS

BACKGROUND

The present disclosure relates to data center management and operations and, more specifically, to a system and method for using augmented reality to assist data center operators.

Augmented reality (AR) is a live direct or indirect view of a physical, real-world environment whose elements are augmented (or supplemented) by computer-generated sensory input such as sound, video, graphics or location data. It is related to a more general concept called mediated reality, in which a view of reality is modified (possibly even diminished rather than augmented) by a computer. As a result, the technology functions by enhancing one's current perception of reality.

Hardware components for AR often include: processors, displays, sensors, and input devices, for example. Modern mobile computing devices like smartphones and tablet computers often contain these elements, which may include cameras and micro-electrical mechanical system (MEMS) sensors, such as accelerometers, global positioning satellite (GPS) devices, and solid-state compasses, for example, that make such mobile computing devices suitable AR platforms. Other AR platforms may include head-mounted displays (HMDs), head-up displays (HUDs), modified glasses or other eyewear, contact lenses, projectors, and other display technologies, which may be portable and/or stationary.

Tagging is the process of connecting digital content to physical elements such as products, packaging, displays, storefronts, and print materials, for example. This digital content may be accessed when a device scans a quick response (QR) code or is moved within range of a near-field communications (NFC) tag, for example.

BRIEF SUMMARY

According to an aspect of the present disclosure, systems and methods disclosed herein may include receiving a notification of an anomaly in a component that supports data center operations within a data center environment. The notification may be provided in response to an occurrence of an anomaly in the data center environment. Such systems and methods may include receiving configuration information identifying positions of each tag of a plurality of tags. Each tag may be disposed proximate to and may represent a respective infrastructure component that supports data center operations within the data center environment. Further, such systems and methods may include detecting, by a sensor, a first tag of the plurality of tags when the mobile device is within a certain proximity of the first tag. The first tag may represent a first component of the infrastructure components that support data center operations within the data center environment. Also, such systems and methods may include determining, using the configuration information, a positional relationship between the first tag and a second tag of the plurality of tags in response to the sensor detecting the first tag. The second tag may represent the particular component. Moreover, such systems and methods may include determining a positional relationship between the mobile device and the particular component based on the positional relationship between the first tag and the second tag. Further still, such systems and methods may include providing first feedback including directional guidance from the first component to the particular component based on the positional relationship between the mobile device and the particular component. In addition, such systems and methods may include detecting, by the sensor, the second tag when the mobile device is within a particular proximity of the second tag. Further yet, such systems and methods may include providing second feedback including information identifying the particular component in response to the sensor detecting the second tag.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

FIG. 6A is a schematic representation of certain infrastructure components within a data center environment; FIG. 6B is a schematic representation of an augmented reality depiction of the infrastructure components of FIG. 6A on a mobile device including directions to a particular infrastructure component; FIG. 6D is a schematic representation of an augmented reality depiction of the particular infrastructure component on the mobile device.

DETAILED DESCRIPTION

Figure 1:
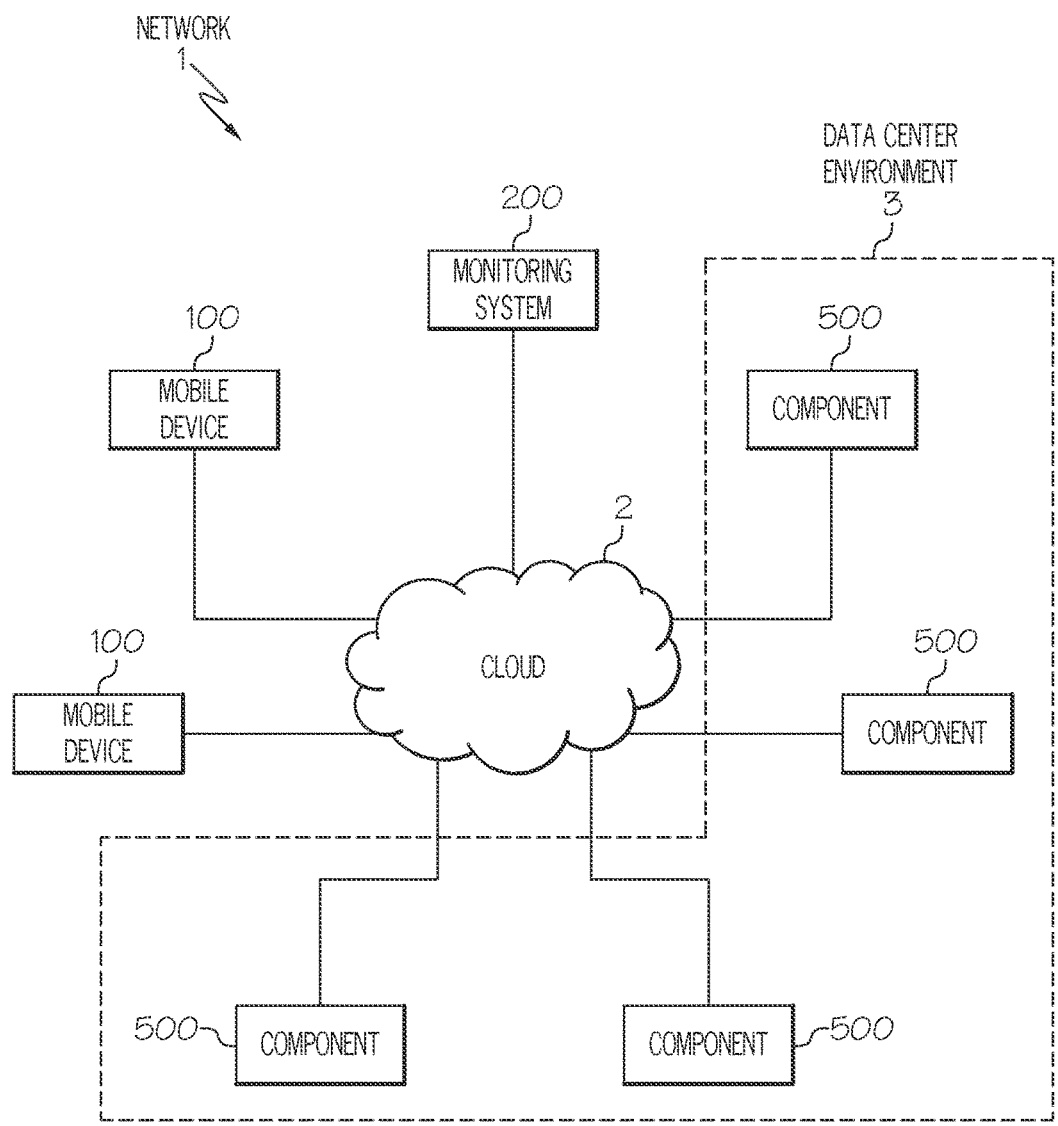
FIG. 1 is a schematic representation of a network including devices, systems, and infrastructure components within a data center environment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. For example, the computer program instructions may be implemented by a processing system, which may include one or more processing devices, such as processors, application-specific integrated circuits, and other processing devices.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to managing and maintaining data center environments, systems and methods disclosed herein may be applicable to a broad range of environments that require maintenance and service. For example, systems and methods disclosed herein may be utilized to identify and repair anomalous components within an automobile or other transportation system, anomalous components within a factory or production environment, anomalous infrastructure components within a residential or commercial building, anomalous municipal infrastructure components, and other anomalous systems and/or components thereof. Moreover, certain systems and methods disclosed herein may be utilized for routine maintenance and/or replacement as well as for repairs and/or replacement in response to anomalous behavior.

A typical datacenter may house many hundreds of computing resources and supporting infrastructure to keep such resources operating. Such environments may not be readily accessible to operators with visual or other impairments. With the proliferation of mobile devices and their supporting capabilities, this no longer needs to be true.

Methods and systems disclosed herein may leverage augmented reality on a mobile device paired with RFIDs, service tags, and datacenter configuration information to aid visually impaired data center operators, for example. The mobile device may issue auditory, haptic and/or enhanced visual commands and information so that a visually impaired operator may locate specific hardware (e.g., networking devices, storage devices, computing resources, HVAC, power units) and perform inspection, maintenance, and repair as needed and/or scheduled, for example.

A mobile application with access to an asset management infrastructure may provide customizable and high-contrast visual, auditory, and/or haptic cues to an impaired operator for navigation and identification of components within a datacenter.

For example, RFIDs and/or other tags may be attached within a data center to aid in navigation. The location of the RFIDs and/or other tags may be captured into a configuration management system, such as CA's Change Management system, for example. Additionally, the location of hardware racks, HVAC equipment, and power equipment relative to the RFIDs and/or other tags would also be captured in the configuration management system. Such information may be collected and/or updated automatically using a mobile device. Computing resources (e.g., storage arrays, network switches, computers) may be added to the layout information in relation to hardware racks, and such layout information may include information like rack and slot number and/or relative locations of such components. With the information captured, an impaired operator running an augmented reality mobile application incorporating processes contemplated herein may enter a data center, ask the mobile device for directions to the equipment the operator is interested in, and the mobile device would interpret the request and, using auditory, visual, and/or haptic commands, guide the operator to the equipment requested using the RFIDs and/or other tags and location information stored in the configuration system. When the operator is guided to the desired rack containing the computing resources, HVAC, or power equipment, the operator may use the mobile device to "read" (e.g., via enhanced visual or auditory information provided to the operator through the mobile device) the service tag, serial number, machine label, or LCD display to locate the specific piece of hardware. The mobile device may use auditory, visual, commands to direct the operator and to inform the operator that the operator has found the specific hardware in question. At this point maintenance may be performed.

Referring now to FIG. 1, a network including devices, systems, and infrastructure components within a data center environment now is described. Network 1 may include one or more clouds 2, which may be public clouds, private clouds, or community clouds. Each cloud 2 may permit the exchange of information and services among devices that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications of information among devices that are connected to cloud 2. Network 1 may further include one or more mobile devices 100, one or more monitoring systems 200, and one or more components 500.

Mobile devices 100 may include mobile telephones, tablet computers, laptop computers, smart watches and other wearable technology, e-readers, diagnostic equipment, and other portable electronic devices capable of connecting with network 1 and of providing information to a user, for example. In some configurations, mobile devices 100 may communicate (e.g., provide information to and/or receive information from) with other components within and/or beyond network 1, such as monitoring systems 200, other mobile devices 100, components 500, and/or other communication components.

Monitoring systems 200 may perform one or more aspects of a monitoring process, such as the monitoring process shown in FIG. 4 below, for example. In some implementations, monitoring systems 200 may store configuration information about network 1 and/or data center environment 3, such as the position of each infrastructure component within data center environment. In certain implementations, the configuration information may include information identifying the position of tags (e.g., QR codes, barcodes, RFID tags, NFC antennas, Bluetooth antennas, other information for identifying infrastructure components) used to label infrastructure components within data center environment 3. Monitoring systems 200 may include one or more of servers, mainframes, computers, and other processing systems, for example, and may provide information to and/or receive information from other components within or external to network 1. In some implementations, monitoring systems 200 may include sensors and/or probes.

Components 500 may be servers, terminals, general purpose computing devices, specialized computing devices, mainframe devices, wired devices, wireless devices, monitoring devices, infrastructure devices, active devices, passive devices, routers, switches, and other devices utilized in an information technology system, for example. One or more components 500 may be organized together in a data center environment 3. Data center environment 3 may include a plurality of infrastructure components. Such infrastructure components may include each component 500 (e.g., IT infrastructure) and/or the physical infrastructure (e.g., racks, walls, doors, HVAC systems, power conduits, doorways, offices, windows, other fixtures) of the data center environment 3. In certain implementations, a plurality of infrastructure components within data center environment 3 may be "labeled," physically or digitally, with tags (e.g., QR codes, barcodes, RFID tags, NFC antennas, Bluetooth antennas, other information for identifying infrastructure components), and information regarding the position of each tag may be stored as configuration information for data center environment 3. In some implementations, monitoring systems 200 may be included in data center environment 3.

Figure 2A:
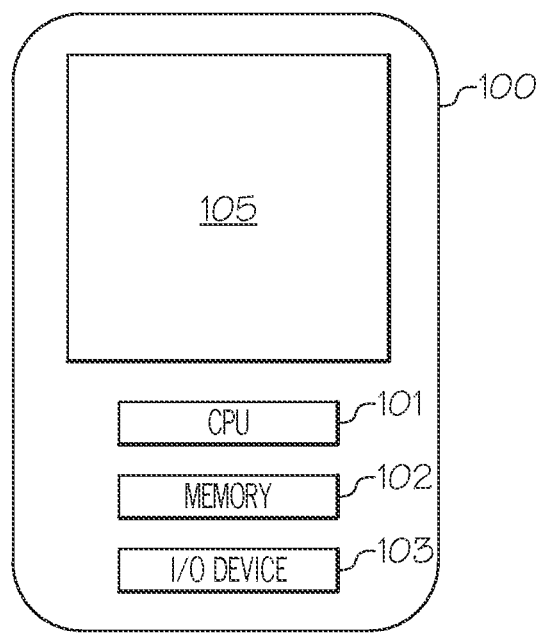
FIG. 2A is a schematic representation of the front of a mobile device.

FIG. 2A shows the front of a mobile device 100 and certain internal components thereof. Mobile device 100 may include a display 105 (e.g., a projector, a touch screen, a solid state display system) that may display information to a user of mobile device 1. Display 105 may also function as an input device in certain implementations. In other implementations, mobile device 100 may include an alternative input device (not shown), such as physical buttons or a touchpad in lieu of or in combination with a touchscreen display. Mobile device 100 may further include a central processing unit ("CPU") 101, a memory 102, and an input and output ("I/O") device 103. Memory 102 may store computer-readable instructions that may instruct CPU 101 and/or other components of mobile device 100 to perform certain processes. In particular, memory 102 may store instructions for performing the process of FIG. 5 (described below), for example.

Figure 2B:
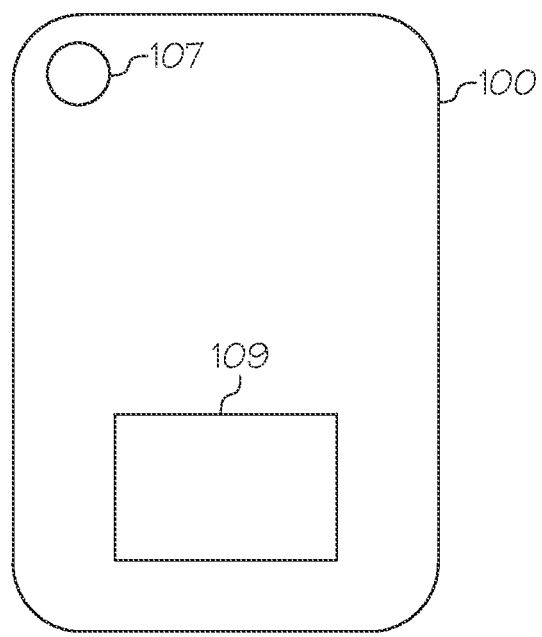
FIG. 2B is a schematic representation of the back of the mobile device of FIG. 2A.

FIG. 2B shows the back of the mobile device of FIG. 2A. Mobile device 100 may include a rear-mounted camera 107 that may be configured to read optical tags and other characters and/or to otherwise capture images (e.g., photos and/or videos) of data center environment 3. Mobile device 100 also may include a sensor 109, which may be a near-field communication ("NFC") sensor, an RFID sensor, and/or another type of tag-reading sensor, for example.

Although not shown in FIGS. 2A and 2B, mobile device 100 may include other sensors and or communication elements, such as Bluetooth modules and/or antennas, RFID readers, front-mounted cameras, and other components, for example. In some implementations, mobile device 100 may provide a haptic feedback mechanism that may provide touch sensation to a user, for example. In certain implementations, mobile device 100 may include speakers for providing auditory information to a user, for example.

Figure 3:
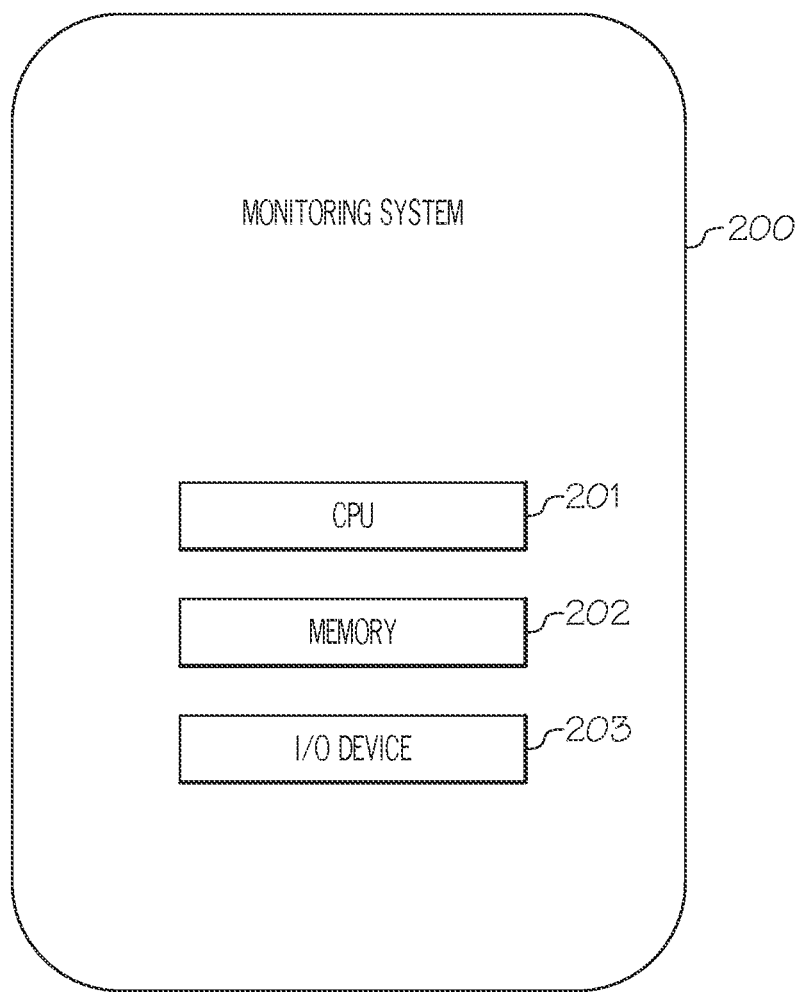
FIG. 3 is a schematic representation of a monitoring system.

FIG. 3 shows a monitoring system 200. Monitoring system 200 may include a CPU 201, a memory 202, and an I/O device 203. Memory 202 may store computer-readable instructions that may instruct CPU 201 and/or other components of monitoring system 200 to perform certain processes. In particular, memory 202 may store instructions for performing the process of FIG. 4 (described below), for example. In some implementations, monitoring system 200 may include sensors and/or probes (not shown). The components of monitoring system 200 may be located together in some implementations and separated in other implementations. In certain implementations, a mobile device 100 may function as monitoring system 200.

Figure 4:
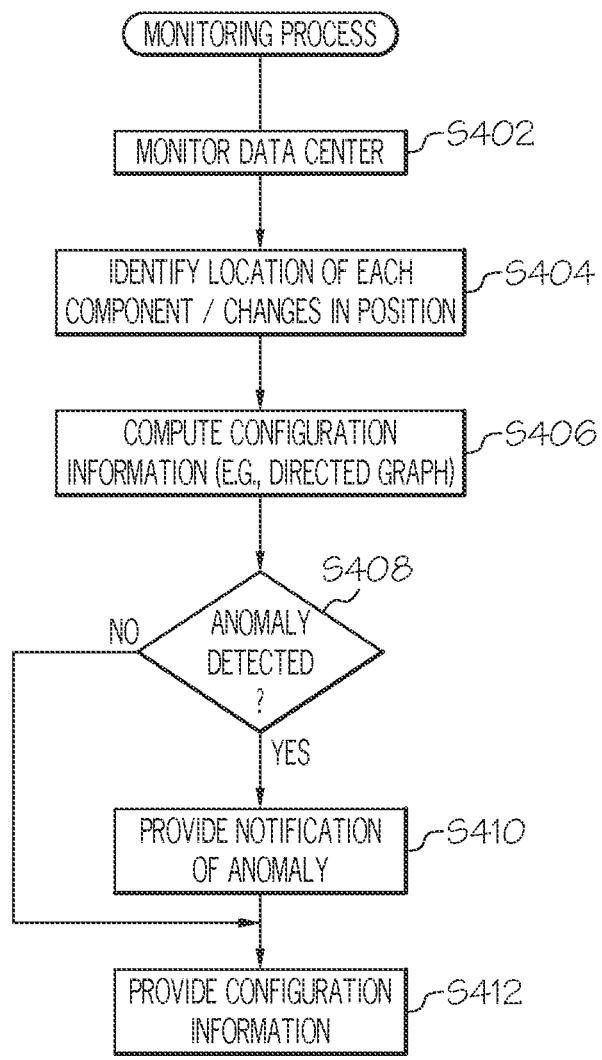
FIG. 4 illustrates a monitoring process for monitoring anomalies and configuration changes within a data center environment.

FIG. 4 shows a monitoring process for monitoring anomalies and configuration changes within a data center environment. The process of FIG. 4 may be performed by a monitoring system 200, for example, and may be used to identify the location of components within data center environment 3 and any changes in the position of such components. The process also may detect anomalous events within data center environment 3, such as network latency or downtime, broken or malfunctioning infrastructure components, and/or other unusual behavior. In some implementations, monitoring system 200 may detect the need to upgrade and/or replace infrastructure components within data center environment 3.

In S402, monitoring system 200 may monitor the behavior of components 500 and/or other infrastructure components of data center environment 3. For example, monitoring system 200 may monitor for changes in network performance that may be indicative of a malfunctioning or otherwise anomalous component 500. Monitoring system 100 may also monitor other infrastructure components, such as an HVAC system, for anomalous behavior. In addition, monitoring system 200 may monitor the position of infrastructure components within data center environment 3, directly or by tracking the position of tags used to label such infrastructure components.

In S404, monitoring system 200 may identify the location of each infrastructure component within data center environment 3. Monitoring system 200 may further identify any changes in position for such infrastructure components, such as a server being moved to a new rack. In certain implementations, the position information for the infrastructure components may be based upon the position of tags associated with the infrastructure components. For example, a wall within data center environment 3 may be marked with a tag, such as an RFID sticker for example, and a server rack may be marked with another tag. The relative positions of the wall and the server rack may be based on the relative positions of the corresponding tags.

In S406, monitoring system 200 may compute configuration information based on the position of each infrastructure component identified in S404. In some implementations, the configuration may be computed as a directed graph including a plurality of edges and nodes. Each node may represent an infrastructure component, and each edge may represent a vector from an infrastructure component to a neighboring infrastructure component. In this manner, a path between infrastructure components may be determined by traversing a series of nodes and edges of the directed graph between the infrastructure components. The configuration information may include information associating each tag with an infrastructure component.

In S408, monitoring system 200 may determine whether an anomalous event has occurred in the data center 3. If an anomalous event has occurred (S408: Yes), the process may move to S410, and monitoring system 200 may provide a notification of the anomaly. For example, the notification of the anomaly may be provided to a system administrator through a mobile device 100. The notification may identify symptoms of the anomaly and, in some implementations, potential causes of the anomaly. In certain implementations, the notification may specifically identify potentially malfunctioning infrastructure components and/or include further steps for performing maintenance. After S410 or a determination that an anomalous event has not occurred in data center environment 3 (S408: No), the process may proceed to S412, and monitoring system 200 may provide configuration information to the system administrator, via a mobile device 100 for example, to assist in locating a malfunctioning component. In some implementations, S412 may be performed before determining whether an anomaly has been detected. In other configurations, S412 may be performed only if an anomaly has been detected in order to reduce the amount of resources used to transmit and update configuration information, for example. In any event, the configuration information may assist the system administrator in planning a route to a malfunctioning component and identifying waypoints along the way to the malfunctioning component that may be useful in guiding a service technician.

Figure 5:
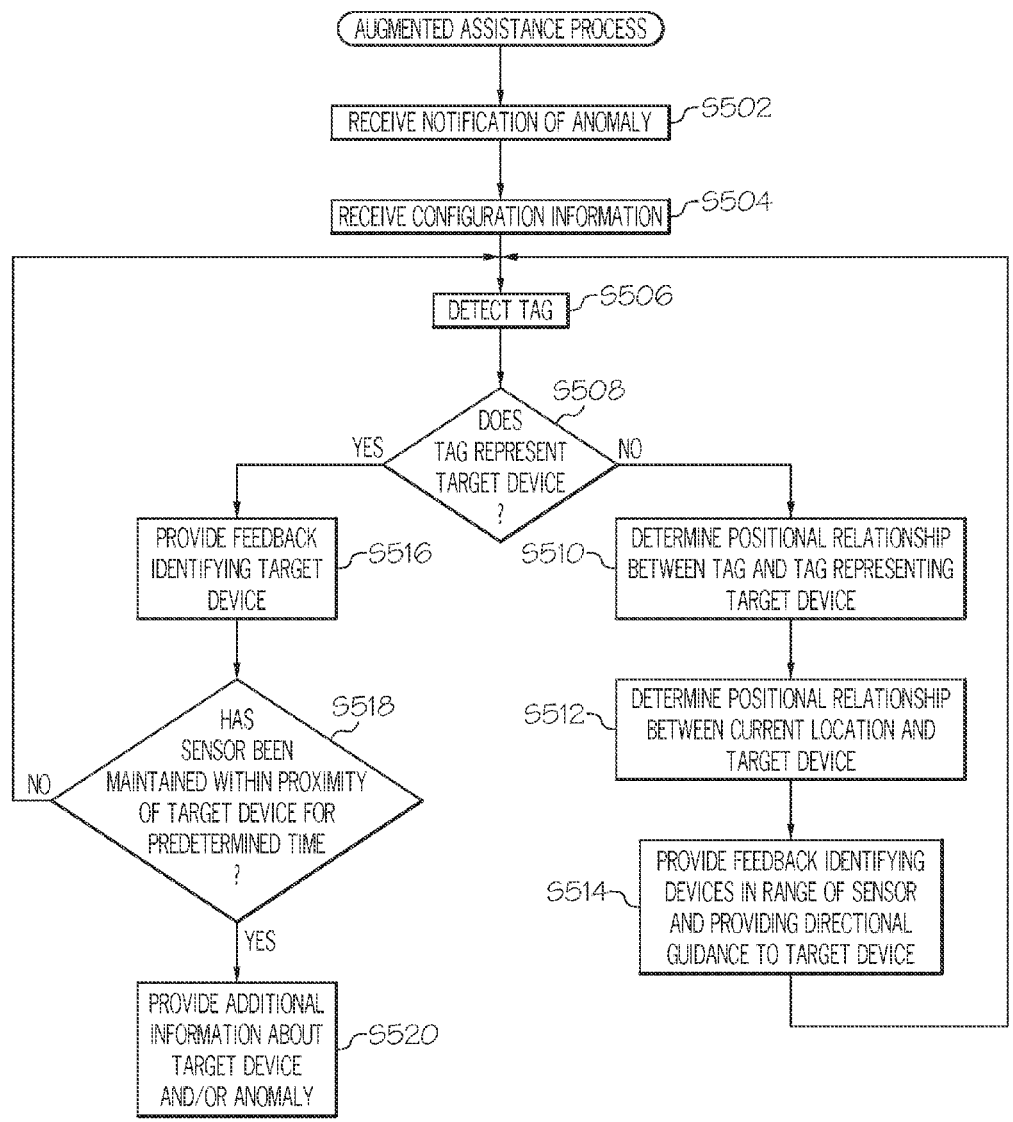
FIG. 5 illustrates an augmented assistance process for guiding a user to an anomalous component within a data center environment and providing information about said device.

FIG. 5 illustrates an augmented assistance process for guiding a data center operator (e.g., a user, service technician, other person) to an anomalous component (or a component otherwise requiring maintenance, replacement, and/or other servicing) within a data center environment and providing information about said device and neighboring devices. The augmented assistance process may assist an impaired data center operator (e.g., a blind operator, an operator with vision or hearing problems, an operator with limited knowledge of the data center and/or the technology housed therein) in performing maintenance on components 500 (or other infrastructure components) within data center environment 3 by providing enhanced visual, auditory, and haptic feedback (e.g., augmented reality information) to the operator via a mobile device 100 that may guide the operator to a component of interest and that may provide the operator with enhanced information about the component, which may include status and other operational information and/or instructions for performing maintenance on such component. For example, mobile device 100 may display an enlarged version of a label, user instructions, or other information affixed to such component and/or display additional information about the component that is not currently affixed to the component. Alternatively or additionally, mobile device may read aloud such label, user instructions, or other information. As another example, moving the mobile device 100 to the right of a component of interest (or the tag corresponding to the component) may invoke a haptic response in the mobile device 100, whereas moving the device to the left would not invoke the haptic response, thereby informing the user to move to the right of the current position.

In S502, mobile device 100 may receive a notification that an anomaly has occurred in the data center environment 3 (e.g., that services within data center environment 3 are not properly functioning, that a component 500 or other infrastructure component is malfunctioning, is otherwise behaving anomalously, and/or is otherwise in need of maintenance). The received notification may be a notification provided by monitoring system 200 in S410, for example. The notification may indicate a particular infrastructure component that may require maintenance, for example.

In S504, mobile device 100 may receive configuration information for the data center environment 3. The configuration information may be up-to-date configuration information, such as the configuration computed in S406 and provided by monitoring system 200 in S412, for example. The configuration information may identify the relative positions of infrastructure components (e.g., physical infrastructure, IT infrastructure) within data center environment 3 and/or the relative positions of tags corresponding to such infrastructure components. As noted above, the configuration information may include a directed graph that includes a plurality of nodes corresponding to each infrastructure component and a plurality of edges representing the relative distances/vectors between infrastructure components.

Based on the notification of the anomaly, a data center operator may enter data center environment 3 (if not already inside data center environment). While inside data center environment 3, the operator's mobile device 100 may use a sensor, such as camera 107 and/or NFC reader 109 for example, to detect a tag in S506. The tag may be a tag disposed on a wall, entryway, or other infrastructure component within data center environment 3, for example. In some implementations, the "tag" may be a Bluetooth antenna inside the data center and associated with an infrastructure component, for example. In certain implementations, it is possible that the initial tag may represent the particular infrastructure component requiring maintenance (e.g., a target component), but it is more likely that the tag may represent another infrastructure component within data center environment 3. The mobile device 100 may detect the tag when the mobile device comes within a certain proximity of the tag. Such proximity may be predetermined or may be based on the sensing capabilities and other physical constraints of the sensor (e.g., the proximity may be different for a camera sensor as opposed to an NFC sensor).

In S508, mobile device 100 may determine whether the detected tag corresponds to (e.g., represents) the target component (e.g., the infrastructure component requiring maintenance). If the detected tag does not represent the target component (S508: No), the process may proceed to S510.

In S510, mobile device 100 may access the configuration information and determine the positional relationship (e.g., the relative positions, a route between) between the detected tag and a tag representing the target component. For example, mobile device 100 may access the directed graph and identify an appropriate path from the node representing the component represented by the detected tag (or the node representing the detected tag itself) to the node representing the target component (or the node representing the tag corresponding to the target component). The path may move along edges and travel through several intermediary nodes between the node representing the detected tag (or its associated component) and the node representing the tag corresponding to the target component (or the target component itself), and the intermediate nodes may serve as waypoints.

In S512, mobile device 100 may use the positional relationship between the detected tag and a tag representing the target component to determine a positional relationship between the current location of the mobile device 100 and the position of the target component. In particular, mobile device 100 may use the position of the detected tag as a proxy for the position of the mobile device 100 itself, such that mobile device 100 uses the positional relationship between the detected tag and the tag representing the target component as the positional relationship between the current location of the mobile device 100 and the position of the target component. Thereafter, mobile device 100 may determine an appropriate route (e.g., path) from the current position of the mobile device 100 (e.g., the position of the detected tag) to the current position of the tag representing the target component. For example, the route may require the data center operator to pass by other tagged components within the data center environment 3. In some configurations, such other tagged components (or such components' tags themselves) may be represented by intermediary nodes in the directed graph, for example. Consequently, the route may be broken into segments corresponding to each intermediate edge between the nodes, such that the detection of a tag corresponding to an intermediary node by mobile device 100 indicates that the mobile device 100 should proceed to the next segment of a route (e.g., the segment corresponding to the edge between the detected intermediary node and the next node in the route).

In S514, mobile device 100 may provide feedback identifying one or more infrastructure components within a specified range of mobile device 100 and provide directional guidance from the current position of mobile device 100 to the target component. For example, camera 107 may capture real-time video of data center environment 3 as the operator moves through the data center environment 3 and display the real-time video on display 105 for the operator to see. In other words, mobile device 100 may act as a see-through (or pass-through) display. Mobile device 100 may augment the real-time video with computer-generated graphical information, such as text identifying the names or other identifiers of components displayed on display 105 and/or other information about such components. Further, such computer-generated augmentation may include directional indicators or commands that provide directional guidance for the operator to reach the target component. In addition to graphical augmentation, mobile device 100 alternatively or additionally may provide haptic and/or auditory augmentation. For example, mobile device may state "You are at Component 3. Component 3 is operating normally. Component 2 is to the left of Component 3." Mobile device may provide spoken directions such as "You have arrived at Component 2. Please proceed to the left to reach Component 1." Further, mobile device 100 may provide haptic feedback such as a vibration when the operator passes by one or more designated intermediary components along the route to the target component. Such haptic feedback may be customized such that the operator would receive different feedback (or no feedback) when moving in the wrong direction or deviating from the designated route. The directional indicators may direct the operator to the next component along the route and/or directly to the target component.

Mobile device 100 may identify the neighboring components by detecting the tags of such components and accessing information associated with the detected tags, by optically reading text or other information from such components, based on the known dimensions and positions of neighboring components, and/or based on relative distances from other detected tags used in combination with the configuration information, for example. Consequently, some implementations may be limited by sensor resolution (e.g., implementations that read tags or other information from neighboring components) while other implementations may be limited only by the resolution of display 105 and desired level of clutter thereon (e.g., implementations that rely on known configurations and relative distances/dimensions). In some implementations, mobile device 100 may track progress along a route based on which other tags the sensor of the mobile device 100 has detected while the mobile device 100 is moved through data center environment 3. The feedback may further identify intermediate infrastructure components along the route from the detected component to the target component as guide points along the route.

After providing feedback and directional guidance in S514, mobile device 100 may return to S506 to detect another tag and then proceed to S508 again to determine whether the newly detected tag represents the target component.

In S508, if mobile device 100 determines that the detected tag represents the target component (S508: Yes), the process may proceed to S516. In S516, mobile device 100 may provide feedback indicating that the target component has been reached. For example, mobile device 100 may augment real-time video displayed on display 105 with graphics, text, and/or other information identifying the target component and clearly indicating that the target component has been located. In some implementations, such graphics, text, and/or other information may blink, flash, and/or increase in size, for example. Mobile device 100 also may provide auditory and/or haptic feedback indicating that the target component has been reached. For example, an alarm may sound and/or mobile device may state that "The target component has been reached." As another example, a predetermined pattern of haptic feedback on the operator's hands may be used to signal that the target component has been reached. Further, mobile device may display status information about the target component or provide such information in audio form.

In S518, mobile device 100 may determine whether the sensor has continued to sense the tag associated with the target component for a predetermined amount of time (e.g., the sensor has been maintained within a predetermined proximity of the target component for the predetermined amount of time). If the sensor has not continued to sense the tag associated with the target component for the predetermined amount of time (S518: No), the process may return to S506 and detect another tag and/or wait until another tag is within a detectable range for detection in S506. If the sensor has continued to sense the tag associated with the target component for the predetermined amount of time (S518: Yes), the process may proceed to S520.

In S520, mobile device 100 may provide additional information about the target component and/or the anomalous event. For example, the additional information may identify relevant anomalous behavior within the data center environment and may assist the operator in diagnosing the problem with the target component. As another example, the additional information may include instructions for repairing, replacing, and/or otherwise maintaining the target component. As still another example, the additional information may identify one or more potential problems with the target component to assist in diagnosing the target component.

While processes of FIG. 5 were described above as being performed by mobile device 100, one or more of the processes of FIG. 5 may be alternatively performed by monitoring system 200 or another device separated from mobile device 100 in order to reduce the processing requirements on mobile device 100, for example. Consequently, mobile device 100 may be in communication with such devices as needed.

Figure 6C:
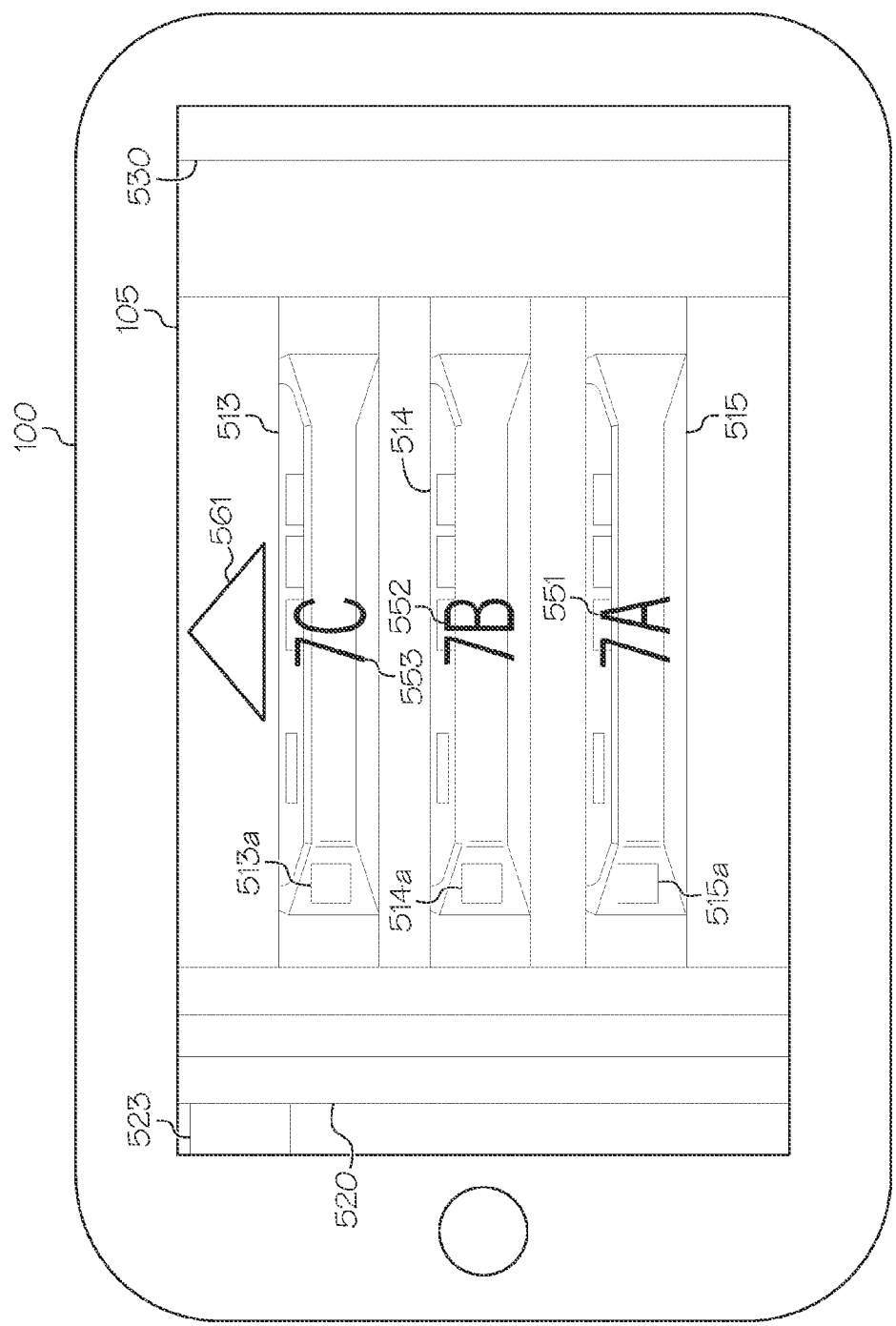
FIG. 6C is a schematic representation of another augmented reality depiction of the infrastructure components of FIG. 6A on the mobile device including further directions to the particular infrastructure component.

An example of the augmented assistance process of FIG. 5 now is described with respect to a schematic example shown in FIGS. 6A-6E. FIG. 6A shows example infrastructure components within data center environment 3. Specifically, FIG. 6A shows server rack 510 supporting server blades 511, 512, 513, 514, 515, server rack 520 supporting server blades 521, 522, 523, and server rack 530 supporting server blades 531, 532. Server racks 510, 520, 530 each have been tagged with respective tags 510a, 520a, 530a, which may be RFID tags, NFC tags, optical tags, Bluetooth tags, and/or another type of tag. Similarly, each of server blades 511, 512, 513, 514, 515, 521, 522, 523, 531, 532 has been tagged with a respective one of tags 511a, 512a, 513a, 514a, 515a, 521a, 522a, 523a, 531a, 532a, which may be RFID tags, NFC tags, optical tags, Bluetooth tags, and/or another type of tag.

FIG. 6B shows an augmented reality depiction of several of the infrastructure components of FIG. 6A on a mobile device including directions to a particular infrastructure component. Specifically, FIG. 6B shows a real-time video of server racks 530, 510 and server blades 531, 532, 511, 512, 513, 514, 515 displayed on mobile device 100 including additional augmentation information. The augmentation information includes a reference identifier 550 for server rack 530 that identifies server rack 530 as server rack number "8." The augmentation information also includes a directional arrow 560 indicating that the target component is to the left of server rack 530. Mobile device 100 may display this augmented information in response to detecting tag 530a and/or in response to detecting a predetermined number of tags 531a, 532a. For example, mobile device may determine that the augmented reality image will be less cluttered if the reference number for server rack 530 is shown as opposed to showing individual identifiers for server blades 531, 532. In addition, identifiers for server rack 510 and server blades 511, 512, 513, 514, 515 may not be displayed for similar reasons.

FIG. 6C shows an augmented reality depiction of several of the infrastructure components of FIG. 6A on the mobile device including further directions to the particular infrastructure component. Specifically, FIG. 6C shows the real-time video with augmentation information after the operator has followed the guiding instructions and moved closer to the target component. Because the mobile device 100 has moved closer to server rack 510, and is thus displaying fewer components onscreen, the augmentation information may include reference identifiers 551, 552, 553 for each of server blades 515, 514, 513 that identify server blades 515, 514, 513 as server blades "7A," "7B," and "7C," respectively, rather than a single identifier identifying server rack 510 as server rack number "7." The augmentation information may further include a directional arrow 561 indicating that the target component is above server blade 513. Such information may be provided in response to the operator moving the mobile device 100 (and the sensors thereof) to a new location and detecting tags 515a, 514a, 513a, for example.

FIG. 6D shows an augmented reality depiction of a target component on the mobile device. Specifically, FIG. 6D shows the real-time video with augmentation information after the operator has followed the guiding instructions and moved mobile device 100 within appropriate proximity to the target component. Mobile device may display augmentation information including an identifier 555 designating server blade 511 as server blade number "7E" and another identifier 570 indicating the designated name (e.g., hostname) of server blade 511. The augmentation information may further include identifying arrows 580 pointing to server blade 511 in order to identify server blade 511 as the target component. Identifying arrows 580 may flash and mobile device 100 may provide additional haptic and auditory feedback indicating that the target component has been reached. Such information may be provided in response to the operator moving the mobile device 100 (and the sensors thereof) to a new location and detecting tag 511a, for example.

Figure 6E:
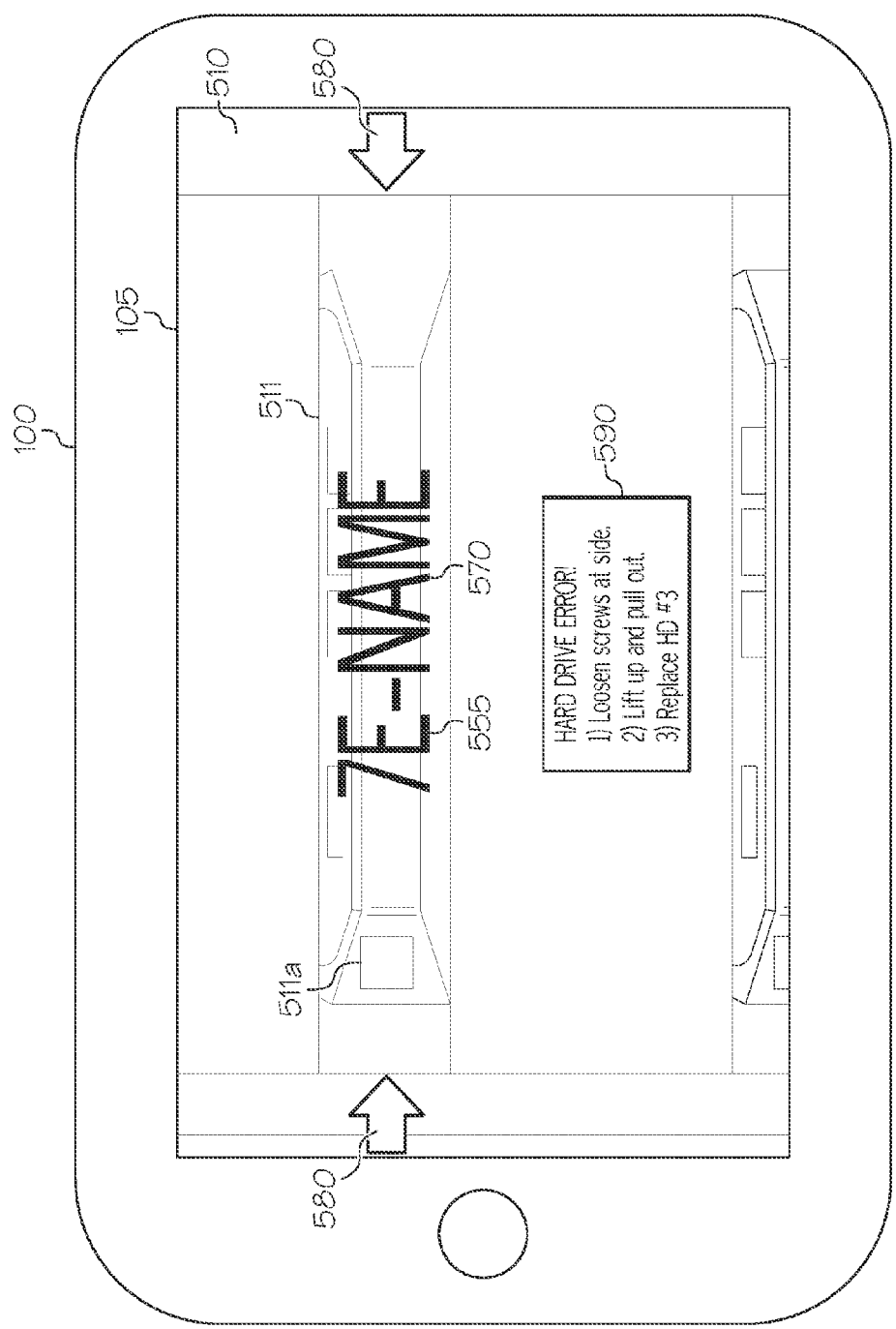
FIG. 6E is a schematic representation of another augmented reality depiction of the particular infrastructure component on the mobile device including instructions for maintaining the particular infrastructure component.

FIG. 6E shows an augmented reality depiction of the target component on the mobile device including instructions for maintaining the particular infrastructure component. Specifically, if the operator maintains mobile device 100 in a position where the sensor continues to detect tag 511a for a predetermined period of time, mobile device 100 may display additional information 590 as further augmentation information. Additional information 90 may include instructions for repairing and/or replacing the target component or components thereof, for example, such as the instructions for replacing a hard drive associated with server blade 511 shown in FIG. 6E.

While the examples of FIGS. 6A-6E above were described as using visual augmented reality information, such examples may readily be configured to integrate haptic and/or auditory feedback as additional or alternative augmented information.

The flowcharts and diagrams in FIGS. 1-6E illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other configurations comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A system comprising:
a mobile device including a sensor and an interface;
a data center environment including a plurality of infrastructure components that support data center operations;
a plurality of tags, each tag of the plurality of tags disposed proximate to and representing a respective component of the plurality of infrastructure components; and
a monitoring system that monitors operations of one or more of the plurality of infrastructure components and that stores configuration information identifying positions of each tag of the plurality of tags,
wherein the monitoring system is configured to provide a notification of an anomaly in a particular component of the plurality of infrastructure components in response to determining that an anomaly has occurred in the data center environment,
wherein the mobile device is configured to receive the configuration information from the monitoring system,
wherein the sensor is configured to detect a first tag of the plurality of tags when the mobile device is within a certain proximity of the first tag, the first tag representing a first component of the plurality of infrastructure components,
wherein the mobile device is configured to determine, using the configuration information, a positional relationship between the first tag and a second tag of the plurality of tags in response to the sensor detecting the first tag, the second tag representing the particular component,
wherein the mobile device is further configured to determine a positional relationship between the mobile device and the particular component based on the positional relationship between the first tag and the second tag,
wherein the interface is configured to provide first feedback including directional guidance from the first component to the particular component based on the positional relationship between the mobile device and the particular component,
wherein the sensor is further configured to detect the second tag when the mobile device is within a particular proximity of the second tag, and
wherein the interface is configured to provide second feedback including information identifying the particular component in response to the sensor detecting the second tag.

2. The system of claim 1,
wherein the configuration information further includes, for each of the plurality of infrastructure components, a name of the infrastructure component and an identifier that identifies which tag of the plurality of tags represents the infrastructure component,
wherein the directional guidance includes auditory commands to move along a route from the first component to the particular component,
wherein the information identifying the particular component includes an auditory recitation of a name for the particular component determined from the configuration information, and
wherein the second feedback further includes a haptic alert, which indicates that the mobile device has located the particular component.

3. The system of claim 2,
wherein the mobile device tracks progress along the route from the first component to the particular component using the sensor to detect each tag of the plurality of tags along the route.

4. The system of claim 1,
wherein the directional guidance includes auditory commands to move along a route from the first component to the particular component, and
wherein the information identifying the particular component includes an auditory recitation of a name for the particular component read from the second tag.

5. The system of claim 1,
wherein the monitoring device is further configured to compute a directed graph including a plurality of nodes and a plurality of edges connecting respective nodes of the plurality of nodes, each node of the plurality of nodes representing a respective tag of the plurality of tags, and each edge representing a route between respective adjacent tags of the plurality of tags,
wherein the configuration information includes the directed graph,
wherein the mobile device is configured to determine the positional relationship between the first tag and the second tag as a path in the directed graph from a first node representing the first tag to a second node representing the second tag, the path including edges and nodes between the first node and the second node in the directed graph,
wherein the mobile device is further configured to determine the positional relationship between the mobile device and the particular component as the path in the directed graph, and
wherein the directional guidance identifies each route represented by each edge in the path.

6. The system of claim 1, wherein the first feedback and the second feedback each include one or more of:
haptic feedback;
audio feedback; and
visual feedback.

7. The system of claim 1,
wherein the interface is configured to display additional information about the particular component in response to the mobile device being maintained within the certain proximity of the second tag for a predetermined amount of time, and
wherein the additional information includes instructions for maintenance of the particular component.

8. The system of claim 1,
wherein the sensor is a camera,
wherein the first tag is a first optical tag,
wherein the second tag is a second optical tag,
wherein the interface includes a display configured to display real-time video captured by the camera, and
wherein the second feedback includes, as the information identifying the particular component, identifying characters overlaid on the particular component in the real-time video.

9. The system of claim 1,
wherein the sensor is configured to detect a third tag of the plurality of tags, the third tag representing a second component of the plurality of infrastructure components that is adjacent to the particular component, and
wherein the interface is configured to provide third feedback including information identifying the second component in response to the sensor detecting the third tag.

10. The system of claim 9,
wherein the sensor is configured to detect a fourth tag of the plurality of tags, the fourth tag representing a third component of the plurality of infrastructure components that is not adjacent to the particular component, and
wherein the interface is configured to provide fourth feedback including information identifying the third component and a fourth component of the plurality of infrastructure components that is adjacent to the third component as an aggregate group in response to the sensor detecting the third tag in response to the sensor detecting the fourth tag.

11. The system of claim 1,
wherein the first tag is a first radio-frequency identification (RFID) tag,
wherein the second tag is a second RFID tag, and
wherein the sensor is an RFID tag reader.

12. The system of claim 1, wherein the directional guidance from the first component to the particular component includes a route from the first component to the particular component with intermediary components of the plurality of infrastructure components specified in the configuration information along the route identified as intermediate guide points.

13. A method comprising:
receiving a notification of an anomaly in a particular component of a plurality of infrastructure components that support data center operations within a data center environment, the notification being provided in response to an occurrence of an anomaly in the data center environment,
receiving configuration information identifying positions of each tag of a plurality of tags, each tag of the plurality of tags disposed proximate to and representing a respective component of the plurality of infrastructure components,
detecting, by a sensor, a first tag of the plurality of tags when the mobile device is within a certain proximity of the first tag, the first tag representing a first component of the plurality of infrastructure components,
determining, using the configuration information, a positional relationship between the first tag and a second tag of the plurality of tags in response to the sensor detecting the first tag, the second tag representing the particular component,
determining a positional relationship between the mobile device and the particular component based on the positional relationship between the first tag and the second tag,
providing first feedback including directional guidance from the first component to the particular component based on the positional relationship between the mobile device and the particular component,
detecting, by the sensor, the second tag when the mobile device is within a particular proximity of the second tag, and
providing second feedback including information identifying the particular component in response to the sensor detecting the second tag.

14. The method of claim 13,
wherein the configuration information further includes, for each of the plurality of infrastructure components, a name of the infrastructure component and an identifier that identifies which tag of the plurality of tags represents the infrastructure component, wherein the directional guidance includes auditory commands to move along a route from the first component to the particular component, wherein the information identifying the particular component includes an auditory recitation of a name for the particular component determined from the configuration information, and wherein the second feedback further includes a haptic alert, which indicates that the mobile device has located the particular component.

15. The method of claim 14, further comprising:
tracking progress along the route from the first component to the particular component by controlling the sensor to detect each tag of the plurality of tags along the route.

16. The method of claim 13,
wherein the configuration information includes a directed graph including a plurality of nodes and a plurality of edges connecting respective nodes of the plurality of nodes, each node of the plurality of nodes representing a respective tag of the plurality of tags, and each edge representing a route between respective adjacent tags of the plurality of tags, wherein determining the positional relationship between the first tag and the second tag comprises determining the positional relationship between the first tag and the second tag to be a path in the directed graph from a first node representing the first tag to a second node representing the second tag, the path including edges and nodes between the first node and the second node in the directed graph, wherein determining the positional relationship between the mobile device and the particular component comprises determining the positional relationship between the mobile device and the particular component to be the path in the directed graph, and wherein the directional guidance identifies each route represented by each edge in the path.

17. The method of claim 13, further comprising:
displaying additional information about the particular component in response to the mobile device being maintained within the certain proximity of the second tag for a predetermined amount of time, the additional information including instructions for maintenance of the particular component.

18. The method of claim 13, further comprising,
detecting, by the sensor, a third tag of the plurality of tags, the third tag representing a second component of the plurality of infrastructure components that is adjacent to the particular component; and providing third feedback including information identifying the second component in response to the sensor detecting the third tag.

19. The method of claim 18, further comprising:
detecting, by the sensor, a fourth tag of the plurality of tags, the fourth tag representing a third component of the plurality of infrastructure components that is not adjacent to the particular component; and providing fourth feedback including information identifying the third component and a fourth component of the plurality of infrastructure components that is adjacent to the third component as an aggregate group in response to the sensor detecting the third tag in response to the sensor detecting the fourth tag.

20. A computer program product comprising:
a non-transitory computer readable storage medium having computer readable program code embodied therewith, the computer readable program code comprising:

computer readable program code configured to receive a notification of an anomaly in a particular component of a plurality of infrastructure components that support data center operations within a data center environment, the notification being provided in response to an occurrence of an anomaly in the data center environment, computer readable program code configured to receive configuration information identifying positions of each tag of a plurality of tags, each tag of the plurality of tags disposed proximate to and representing a respective component of the plurality of infrastructure components, computer readable program code configured to detect a first tag of the plurality of tags when the mobile device is within a certain proximity of the first tag, the first tag representing a first component of the plurality of infrastructure components, computer readable program code configured to determine, using the configuration information, a positional relationship between the first tag and a second tag of the plurality of tags in response to the sensor detecting the first tag, the second tag representing the particular component, computer readable program code configured to determine a positional relationship between the mobile device and the particular component based on the positional relationship between the first tag and the second tag, computer readable program code configured to provide first feedback including directional guidance from the first component to the particular component based on the positional relationship between the mobile device and the particular component, computer readable program code configured to detect the second tag when the mobile device is within a particular proximity of the second tag, and computer readable program code configured to provide second feedback including information identifying the particular component in response to the sensor detecting the second tag.

* * * * *